(12) United States Patent
Roh et al.

(10) Patent No.: US 10,173,587 B2
(45) Date of Patent: Jan. 8, 2019

(54) BRAKE LIGHT SENSOR MODULE

(71) Applicant: erae AMS Co., Ltd., Daegu (KR)

(72) Inventors: Chul-Kyun Roh, Daegu (KR);
Sang-Bo Kim, Daegu (KR); Dong-Han Han, Daegu (KR)

(73) Assignee: erae AMS Co., Ltd., Daegu (KR)

( * ) Notice: Subject to any disclaimer, the term of this patent is extended or adjusted under 35 U.S.C. 154(b) by 15 days.

(21) Appl. No.: 15/123,391

(22) PCT Filed: Feb. 26, 2015

(86) PCT No.: PCT/KR2015/001895
§ 371 (c)(1),
(2) Date: Sep. 2, 2016

(87) PCT Pub. No.: WO2015/133764
PCT Pub. Date: Sep. 11, 2015

(65) Prior Publication Data
US 2017/0057406 A1 Mar. 2, 2017

(30) Foreign Application Priority Data
Mar. 3, 2014 (KR) .................. 10-2014-0024921

(51) Int. Cl.
*B60Q 1/44* (2006.01)
*B60T 7/04* (2006.01)
*B60T 17/22* (2006.01)
*G01D 5/12* (2006.01)

(52) U.S. Cl.
CPC .............. *B60Q 1/441* (2013.01); *B60T 7/042* (2013.01); *B60T 17/22* (2013.01); *G01D 5/12* (2013.01)

(58) Field of Classification Search
CPC ...... F15B 15/2861; B60T 7/042; B60T 11/16; B60T 17/22; B60Q 1/441; G01D 5/12; G01D 5/125
See application file for complete search history.

(56) References Cited

U.S. PATENT DOCUMENTS

2004/0239175 A1* 12/2004 Beccafico ............... B60T 7/042
303/113.1

FOREIGN PATENT DOCUMENTS

| DE | 102004029193 A1 | 1/2006 | |
|---|---|---|---|
| DE | 102005018649 A1 | 10/2006 | |
| DE | 102008020934 A1 * | 10/2009 | ............. B60T 11/20 |
| DE | 102010027308 A1 | 1/2012 | |
| DE | 102010062163 A1 | 5/2012 | |

(Continued)

*Primary Examiner* — Son Le
*Assistant Examiner* — Dustin Dickinson
(74) *Attorney, Agent, or Firm* — Novick, Kim & Lee, PLLC; Jae Youn Kim

(57) ABSTRACT

A brake light sensor module includes: a retainer which is provided to move together with an operation element of a master cylinder in response to a depression of a brake pedal; an operation rod which is connected to the retainer so as to move together with the retainer; an elastic member which is installed in the master cylinder; a signal transmitting element which is installed in the master cylinder, one end of the signal transmitting element being elastically supported by the elastic member, and the other end of the signal transmitting element being supported by the operation rod; and a sensor which is installed in the master cylinder so as to be operated by the signal transmitting element.

5 Claims, 8 Drawing Sheets

(56) References Cited

FOREIGN PATENT DOCUMENTS

| EP | 1972516 A2 | 9/2008 | |
|----|------------|--------|---|
| EP | 2407361 A1 * | 1/2012 | ............... B60Q 1/44 |
| FR | 2919251 A1 | 1/2009 | |
| FR | 2938810 A1 | 5/2010 | |
| KR | 10-2009-0101556 A | 9/2009 | |
| KR | 10-2013-0029984 A | 3/2013 | |
| KR | 10-2013-0064665 A | 6/2013 | |

* cited by examiner

# BRAKE LIGHT SENSOR MODULE

TECHNICAL FIELD

The present invention relates to a brake system, and more particularly to a brake light sensor module which detects an appliance of a brake in order to turn on/off a brake light when a brake is applied.

BACKGROUND ART

When a brake is applied, a brake light is turned on to warn the appliance of a brake to the outside.

Conventionally, a method in which a sensor which is configured to detect the depression of a brake pedal is attached to a brake pedal and a brake light is turned on in accordance with a signal of this sensor is generally used. In such a method, there is a disadvantage in packaging a brake pedal, and since the sensor is disposed in a cabin, a noise problem may occur. Meanwhile, a method in which a brake light is turned on/off by detecting a movement of an input element which is activated in association with a depression of a brake pedal using a sensor which is mounted to a brake master cylinder has been introduced. However, there is a problem in that a mounting structure of a sensor to a master cylinder is complicated and there are other problems.

DETAILED DESCRIPTION OF THE INVENTION

Technical Problem

The present invention has been made in an effort to provide a brake light sensor module which has a simple mounting structure to mount a sensor module for operating a brake light to a master cylinder and allows a stable operation.

Technical Solution

A brake light sensor module according to an embodiment of the present invention includes: a retainer which is provided to move together with an operation element of a master cylinder in response to a depression of a brake pedal; an operation rod which is connected to the retainer so as to move together with the retainer; an elastic member which is installed in the master cylinder; a signal transmitting element which is installed in the master cylinder, one end of the signal transmitting element being elastically supported by the elastic member, and the other end of the signal transmitting element being supported by the operation rod; and a sensor which is installed in the master cylinder so as to be operated by the signal transmitting element.

The master cylinder may be provided with an insertion hole which is elongated in a direction parallel to a moving direction of the operation element, and the signal transmitting element may be movably disposed in the insertion hole.

The operation element may be a power piston, and the retainer may include: an operation rod supporting portion which is connected to an opening side of the power piston and to which the operation rod is connected; a reaction rod supporting portion which is disposed within the power piston and supports the reaction rod; and a rib which connects the operation rod supporting portion and the reaction rod supporting portion together.

An air passage may be formed in the operation rod supporting portion.

The operation rod supporting portion may have a ring shape having a through hole at a center portion thereof and may be provided with a fixing indentation for a connection with the power piston at an outer edge area thereof.

An air passage may be formed in the reaction rod supporting portion.

The operation rod may be a power piston and the retainer may be connected to an opening side of the power piston and may have a ring shape having a through hole at a center portion thereof.

The retainer may be provided with an indentation into which an end of the operation rod is fitted.

An inner edge portion of the retainer may be inclined to be retracted toward the outside of the opening portion of the power piston.

An inner edge portion of the retainer may have an operation rod supporting portion which supports an end of the operation rod and an assembling guide portion.

A protrusion for the connection with the power piston may be provided at an outer edge portion of the retainer.

The retainer may have a ring shape in which a circumferential portion has been removed.

The retainer may be provided with a tool insertion hole.

An indentation may be formed on an inner surface of the power piston, and the retainer may be disposed in the indentation. The brake light sensor module may further includes an elastic member which is disposed in the indentation to elastically support the retainer.

Advantageous Effects

According to a present invention, since an operation rod is configured to move together with a power piston by a retainer, a brake light sensor module can be installed to a master cylinder via a simple structure.

DETAILED DESCRIPTION OF THE EMBODIMENTS

Embodiments of present invention will be explained hereinafter referring to the accompanying drawings.

Figure 1:
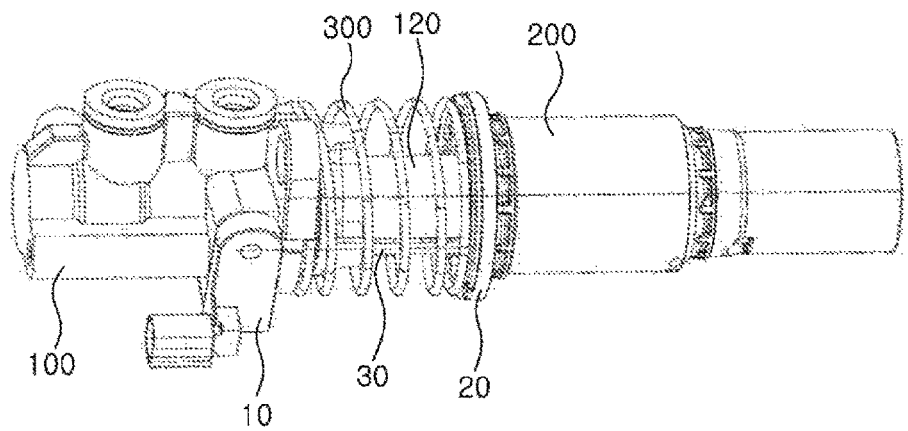
FIG. 1 is a perspective view of a master cylinder in which a brake light sensor module according to an embodiment of a present invention is installed.
Figure 2:
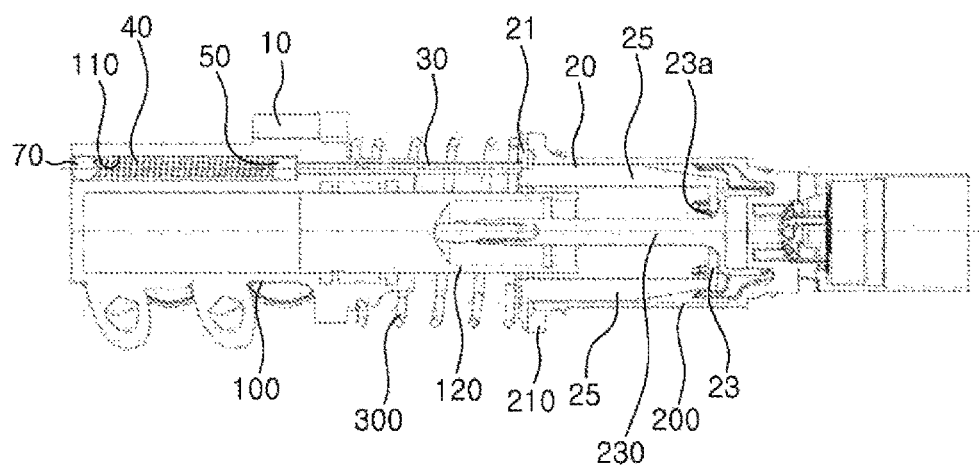
FIG. 2 is a sectional view of a master cylinder in which a brake light sensor module according to an embodiment of a present invention is installed.
Figure 3:
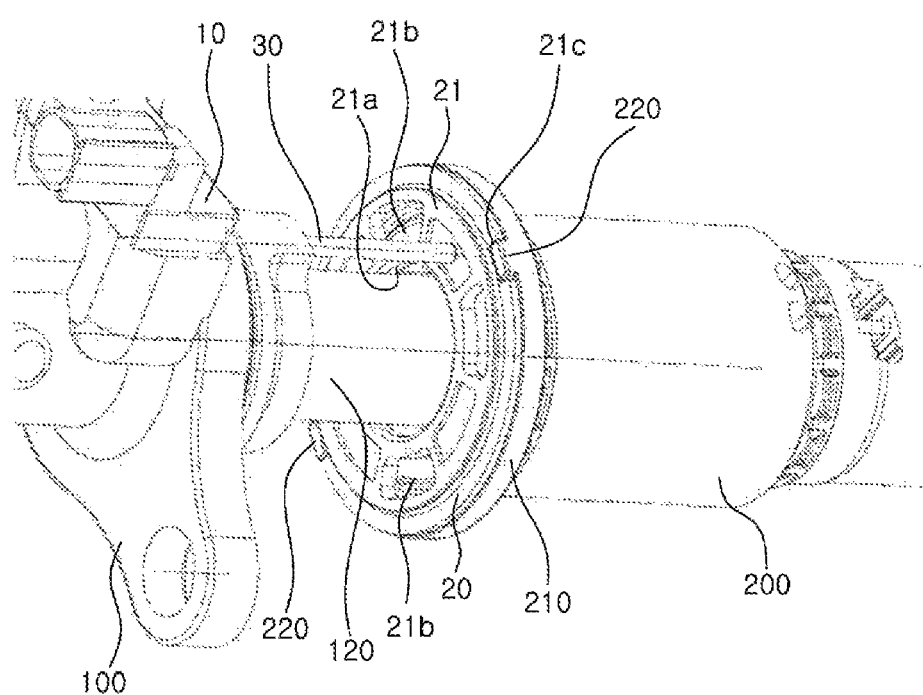
FIG. 3 shows a state in which a retainer and an operation rod of a brake light sensor module according to an embodiment of a present invention is installed in a power piston.

Referring to FIG. 1 to FIG. 3, a sensor 10 which generates a signal for turning on/off a brake light is installed in a master cylinder 100.

A retainer 20 is mounted to an operation element of the master cylinder 100, i.e., a power piston 200 so as to move together with the power piston 200 in response to a depression of a brake pedal, and an operation rod 30 is connected to the retainer 20 so as to move together with the retainer 20.

Further, as shown in FIG. 2, an elastic member 40 is disposed to be supported by a housing 110 of the master cylinder 100. The elastic member 40 may be a coil spring.

Meanwhile, a signal transmitting element 50 is movably disposed in the master cylinder 100. The signal transmitting element 50 may be a member which can transmit a signal for operating the sensor 10, and may be a magnet. Hereinafter, a member designated by reference numeral 50 will be referred to a magnet.

As shown in FIG. 2, the magnet 50 may be movably disposed in a state that one side of the magnet 50 is elastically supported by the elastic member 40 and the other side thereof is supported by the operation rod 30. For example, referring to FIG. 2, an insertion hole 110 is formed in the master cylinder 100 by being elongated in a direction parallel to a moving direction of the power piston 200, and the magnet 50 may be movably disposed in the insertion hole 110. Remaining side of the elastic member 40 may be supported by a ball 70 which is disposed in the insertion hole 110.

The sensor 10 may be a sensor which is operated by the magnet 50 and detects at least one of a position and a moving distance of the magnet 50. The sensor 10 may output a signal corresponding to a position of the magnet 50.

The master cylinder 100 and the power piston 200 may be the same with the prior art, and the master cylinder 100 and the power piston 200 are supported to one another via a return spring 300. The power piston 200 is an element which moves toward the master cylinder 100 in response to the depression of a brake pedal.

If the power piston 200 moves in response to the depression of the brake pedal, the retainer 20 moves together with the power piston 200 and thereby the operation rod 30 also moves. If the operation rod 30 moves, the magnet 50 which is supported thereto overcomes the elastic power of the elastic member 40 so as to move. The sensor 10 operates by the movement of the magnet 50 and outputs a corresponding signal, and a brake light may be configured to be turned on by this signal.

A retainer of a brake light sensor module according to an embodiment of the present invention will be described in detail hereinafter referring to the accompanying drawings.

Figure 4:
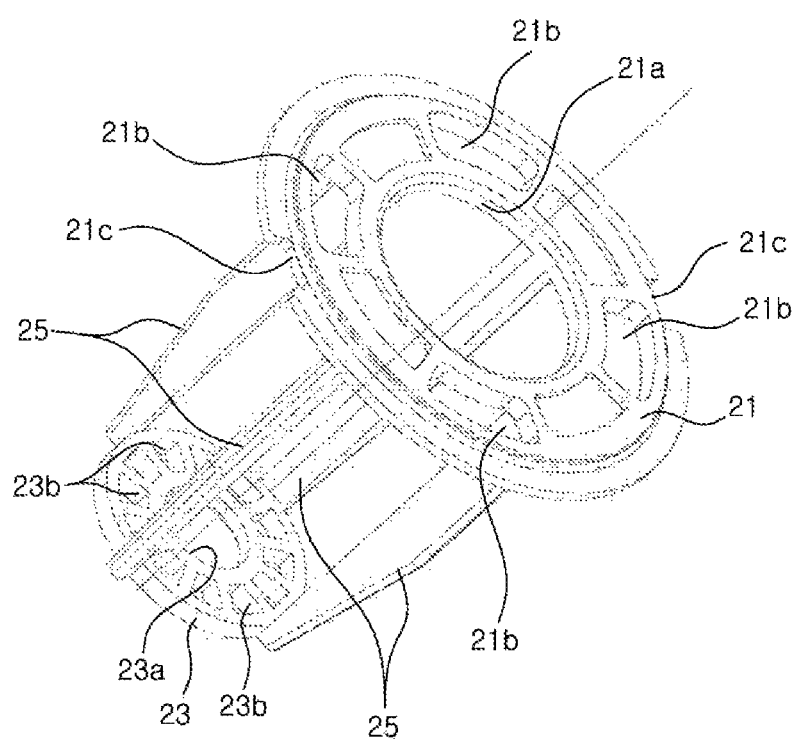
FIG. 4 is a perspective view of a retainer of a brake light sensor module according to an embodiment of a present invention.
Figure 5:
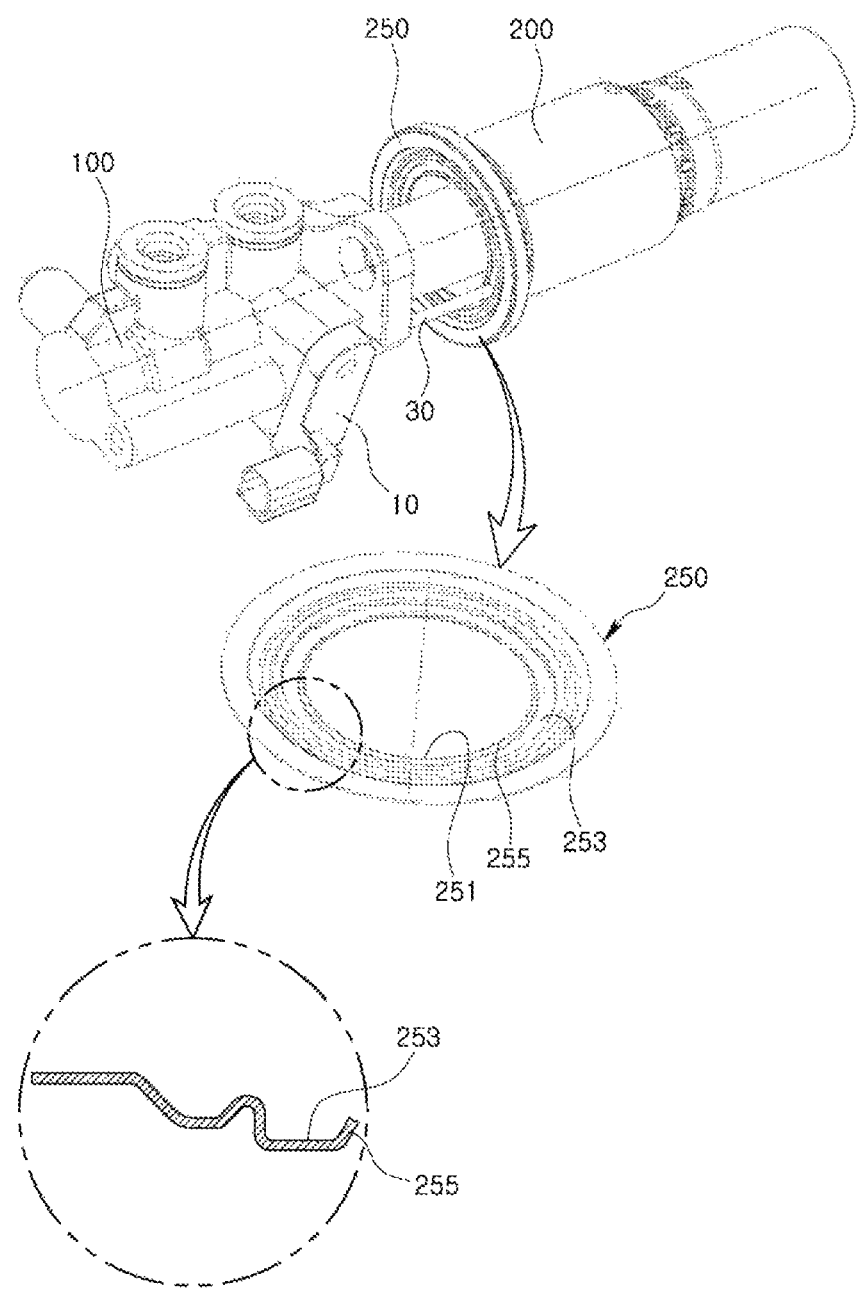
FIG. 5 is a perspective view of a retainer of a brake light sensor module according to another embodiment of a present invention.

Referring to FIG. 3 to FIG. 5, the retainer 20 includes an operation rod supporting portion 21, a reaction rod supporting portion 23, and ribs 25 which connect the operation rod supporting portion 21 and the reaction rod supporting portion 23.

The operation rod supporting portion 21 is connected to an opening side 210 of the power piston 200, and the operation rod 30 is connected to the operation rod supporting portion 21 to be supported by the same. The operation rod supporting portion 21 has a through hole 21a at a center portion thereof to have a ring shape, and a piston 120 of the master cylinder 100 is disposed in a state of passing through the through hole 21a of the operation rod supporting portion 21.

An air passage 21b may be formed in the operation rod supporting portion 21. The air passage 21b is formed to maintain vacuum level so as to allow the master cylinder 100 to operate smoothly. The air passage 21b may be formed in plural, and the plurality of the air passages 21b may be disposed in a circumferential direction with a constant distance therebetween.

Meanwhile, the fixing indentation 21c for the connection with the power piston 200 may be formed at an outer edge area of the operation rod supporting area 21. A fixing protrusion 220 of the power piston 200 is fitted into the fixing indentation 21c, and thereby the operation rod supporting portion 21 may be fixed to the power piston 200.

The reaction rod supporting portion 23 is disposed within the power piston 200 and supports a reaction rod 230. A through hole 23a is formed at a center area of the reaction rod supporting portion 23, and the reaction rod 230 passes through the through hole 23a and is supported by the reaction rod supporting portion 23.

Meanwhile, an air passage 23b is formed in the reaction rod supporting portion 23. The air passage 23b may be provided in plural, and the plurality of the air passages 23b may be disposed in a circumferential direction with a constant distance therebetween.

The operation rod supporting portion 21 and the reaction rod supporting portion 23 are connected to one another by the rib 25. The rib 25 may be provided in plural, and the plurality of the ribs 25 may be disposed in a circumferential direction with a constant distance therebetween.

Retainers according to other embodiments of the present invention will be described hereinafter referring to FIG. 5 to FIG. 9. The retainers according to these embodiments are connected to an opening side of the power piston and has a ring shape to have a through hole at a center portion thereof.

First, referring to FIG. 5, a retainer 250 is formed to be connected to the opening side 210 of the power piston 200 and is provided with a through hole 251 at a center portion thereof. The retainer 250 is provided with an indentation 253 into which one end of the operation rod 30 is fitted.

Meanwhile, an inner edge portion 255 of the retainer 250 may be inclined to be retracted toward the outside of the opening portion 210 of the power piston 200.

Figure 6:
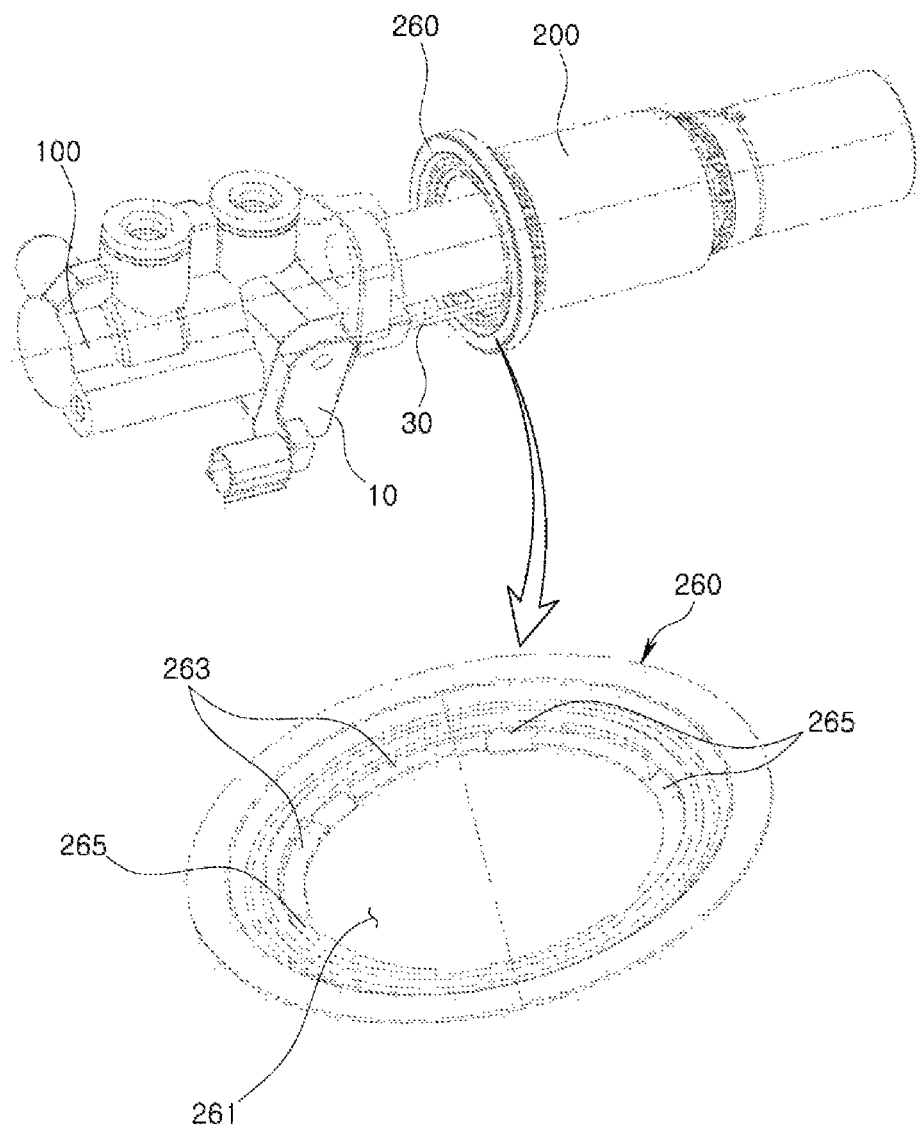
FIG. 6 is a perspective view of a retainer of a brake light sensor module according to yet another embodiment of a present invention.

Referring to FIG. 6, a retainer 260 is configured to be connected to the opening portion 210 of the power piston 200 and is provided with a through hole 261 at a center portion thereof. The retainer 260 includes an operation rod supporting portion 263 which supports one end of the operation rod 30 and an assembling guide portion 265. The assembling guide portion 265 plays a role of making the assembling with the power piston 200 easy.

Figure 7:
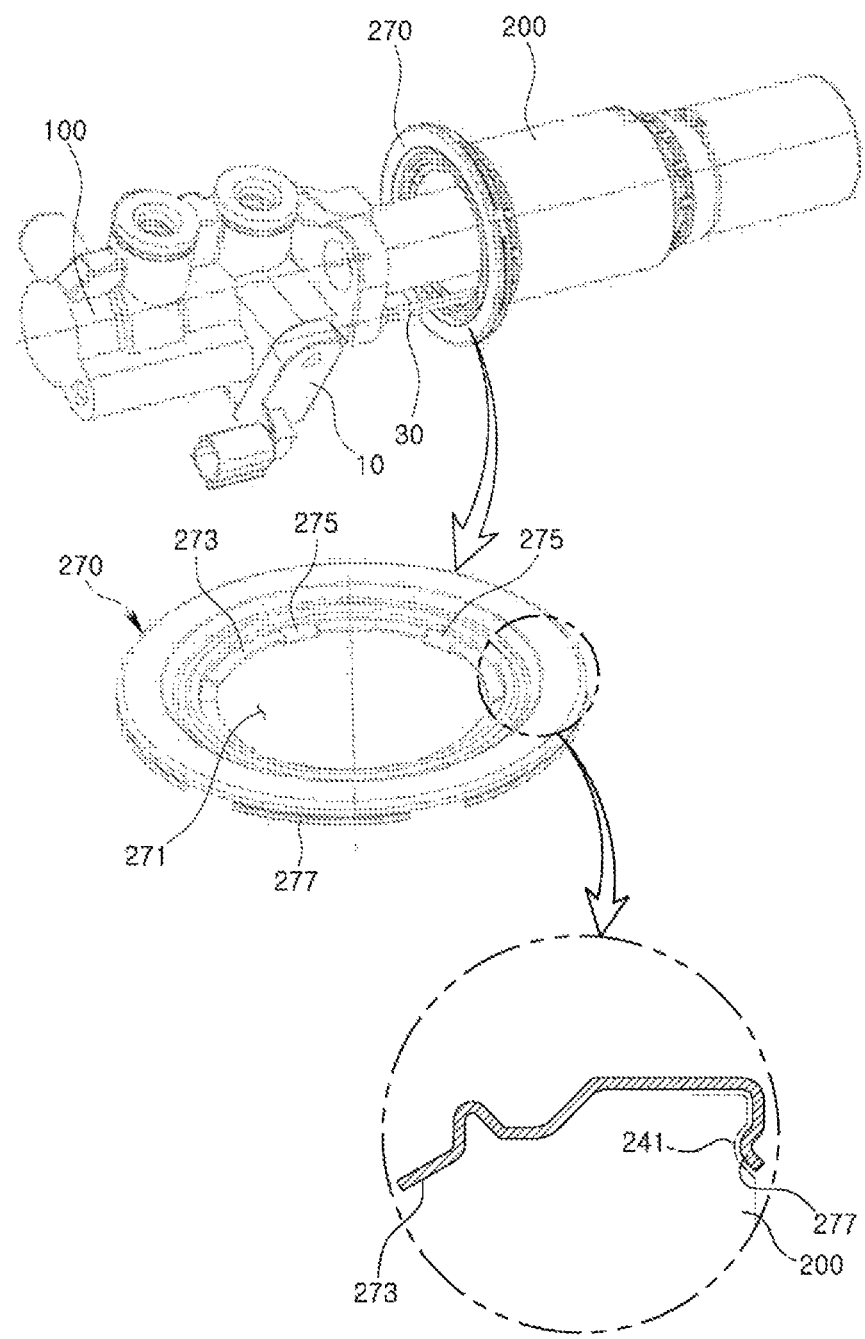
FIG. 7 is a perspective view of a retainer of a brake light sensor module according to yet another embodiment of a present invention.

Referring to FIG. 7, a retainer 270 is configured to be connected to the opening portion 210 of the power piston 200 and is provided with a through hole 271 at a center portion thereof. The retainer 270 includes an operation rod supporting portion 273 which supports one end of the operation rod 30 and an assembling guide portion 275. The assembling guide portion 275 plays a role of making the assembling with the power piston 200 easy. Further, a protrusion 277 for being fixed with the power piston for the connection with the power piston 299 may be provided at an outer edge portion of the retainer 270. As shown in FIG. 7, the protrusion 277 may be formed by being protruded in a radially inward direction, and the protrusion 277 is fitted into a connection groove 241 which is formed on an outer surface of the power piston 200, thus the retainer 270 is stably connected to the power piston 200.

Another embodiment of the present invention will be described referring to FIG. 8 to FIG. 10 hereinafter.

Figure 8:
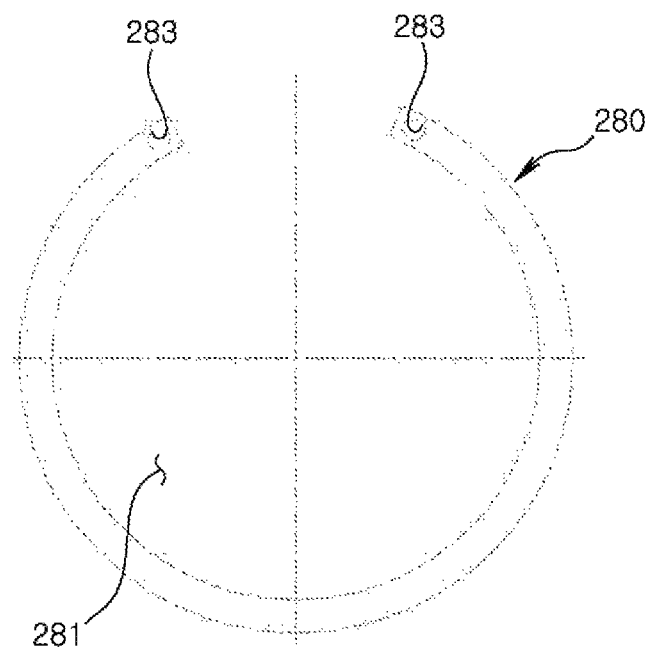
FIG. 8 is a perspective view of a retainer of a brake light sensor module according to yet another embodiment of a present invention.

As shown in FIG. 8, a retainer 280 is configured to be connected to the opening portion 210 of the power piston 200 and is provided with a through hole 281 at a center portion thereof. At this time, as shown in FIG. 8, the retainer 280 has a ring shape in which a circumferential portion of a ring has been removed. The retainer 280 is provided with a tool insertion hole 283. The retainer 280 may be coupled to the power piston 200 in a state of being retracted by a tool which is inserted into the tool insertion hole 283.

Figure 9:
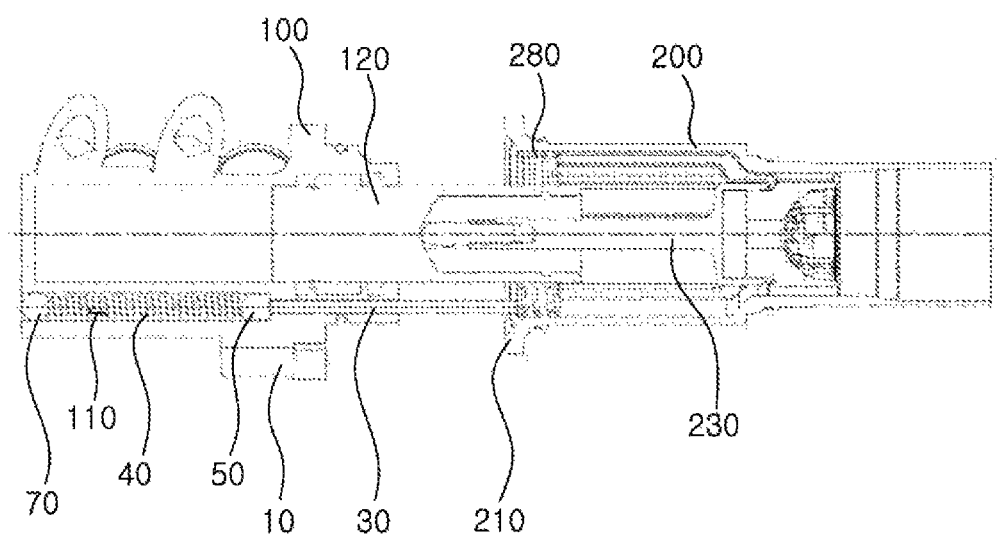
FIG. 9 and FIG. 10 show a state in which a retainer of FIG. 8 is installed.
Figure 10:
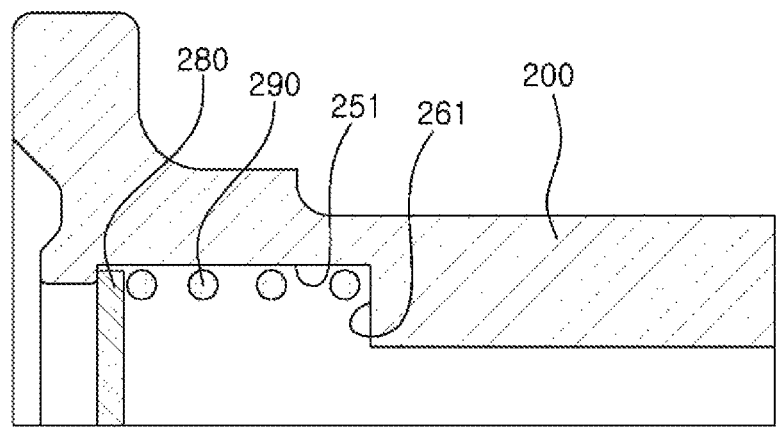

Referring to FIG. 9 and FIG. 10, the retainer 280 is installed to the opening portion 201 of the power piston 200. At this time, an indentation 251 is formed on an inner surface of the power piston 200, and the retainer 280 is elastically supported by an elastic member 290 which is disposed in the indentation 251. That is, referring to FIG. 9 and FIG. 10, one end of the elastic member 290 is supported against a wall 261 defining the indentation 251 and the other end thereof supports the retainer 280. Further, the operation rod 30 is disposed to be supported by the retainer 280.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a brake light sensor module and can be applied to a vehicle so as to have an industrial applicability.

The invention claimed is:

1. A brake light sensor module comprising:
a retainer configured to move together with a power piston of a master cylinder in response to a depression of a brake pedal;
an operation rod connected to the retainer so as to move together with the retainer;
an elastic member installed in the master cylinder;
a signal transmitting element movably installed in the master cylinder so as to move together with the power piston in response to the depression of the brake pedal, wherein one end of the signal transmitting element is elastically supported by the elastic member, and
wherein another end of the signal transmitting element is supported by the operation rod; and
a sensor installed in the master cylinder so as to be operated by the signal transmitting element,
wherein the retainer comprises:
an operation rod supporting portion connected to an opening side of the power piston and to which the operation rod is connected;
a reaction rod supporting portion disposed within the power piston and supporting a reaction rod of the master cylinder; and
a rib connecting the operation rod supporting portion and the reaction rod supporting portion together and extending along in a direction parallel to a moving direction of the power piston.

2. The brake light sensor module of claim 1, wherein the master cylinder includes an insertion hole elongated in a direction parallel to the moving direction of the power piston, and the signal transmitting element is movably disposed in the insertion hole.

3. The brake light sensor module of claim 1, wherein an air passage is disposed in the operation rod supporting portion.

4. The brake light sensor module of claim 1, wherein the operation rod supporting portion has a ring shape having a through hole at a center portion thereof and a fixing indentation connected with the power piston at an outer edge area thereof.

5. The brake light sensor module of claim 1, wherein an air passage is disposed in the reaction rod supporting portion.

* * * * *